Nov. 30, 1937.  J. E. MARSDEN  2,100,487
COFFEE MAKER
Filed Nov. 17, 1936
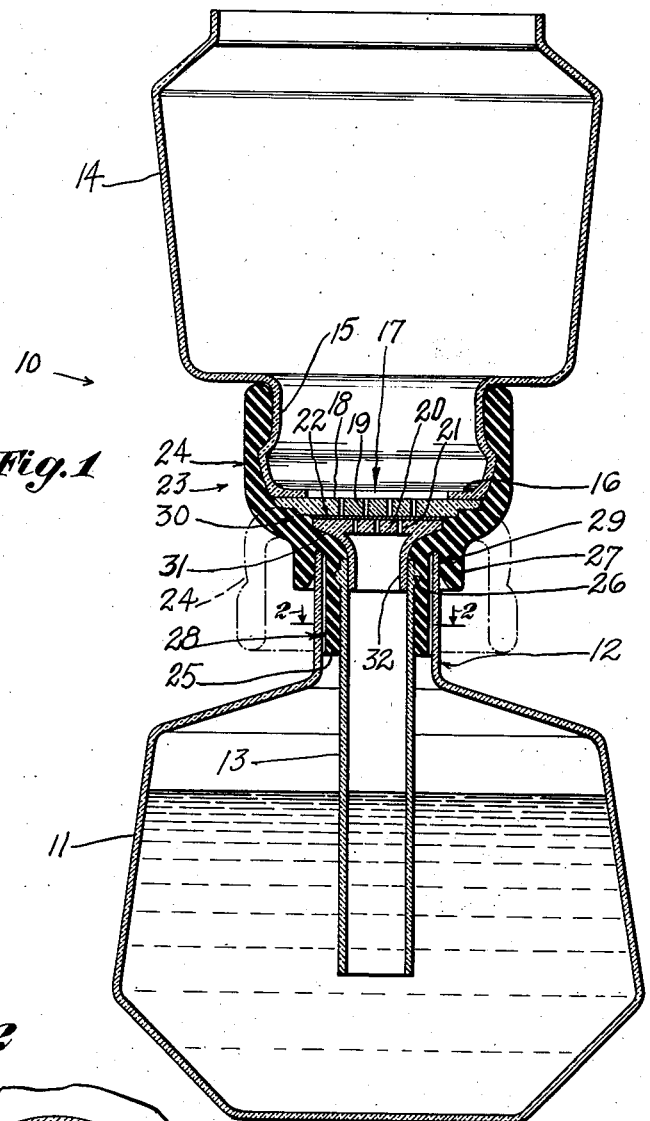
Fig.1
Fig.2
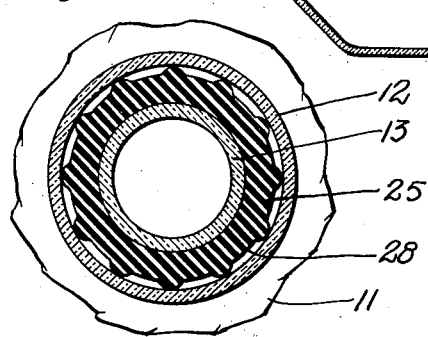
John E. Marsden INVENTOR.
BY
ATTORNEY.

Patented Nov. 30, 1937

2,100,487

UNITED STATES PATENT OFFICE 2,100,487

COFFEE MAKER

John E. Marsden, Philadelphia, Pa.

Application November 17, 1936, Serial No. 111,243

8 Claims. (Cl. 53—3)

This invention relates to coffee making devices, and has particular reference to coffee makers of the vacuum type.

Among the objects of the invention is to provide a coffee maker wherein improved means prevent excessive breakage of the tube; the excessive sticking of the rubber gasket in the lower globe is avoided; special attachments, metallic parts and the like for securing the filter are dispensed with; and a particularly simple means afforded for accomplishing these objects, which shall cause the coffee maker to be operatively gas tight, and which shall prevent contact of the coffee with rubber or the like.

More specifically, it is one object of the invention to provide a coffee maker having improved means including a combined gasket and coupling of resilient elastic material for the upper globe and a separate tube to be thus flexibly connected to the upper globe.

Another specific object of the invention is to provide a coffee maker having improved means for housing a flow control or filtering device and interconnecting an upper container with a lower unit so that the said device is thus secured therebetween.

A further object of the invention is the provision of a coffee maker having relatively few and simple parts, and which is inexpensive to manufacture, easy to clean, and assemble, neat in appearance, durable, reliable and efficient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a vertical sectional view showing a device embodying the invention and indicating in dot-dash lines the position of a portion thereof in course of assembling the device.

Fig. 2 is a sectional view taken on the line 2—2 of Fig. 1.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a coffee maker which embodies the invention. This is preferably of the well known vacuum type, and includes a lower container 11 having an opening defining top wall or neck 12.

Within the lower container 11 is a tube which extends into the tubular wall 12 and may be annularly spaced therefrom, but in any case, is in fluid tight engagement with the wall 12 so that the tube 13 and the container 11 thus provide a fluid tight unit, except for the passage in the tube 13, which is open at the top.

An upper container 14 may have a suitable top opening and a bottom outlet portion 15 which may have communication with the tube 13. The outlet portion 15 may have an inward extending annular seating flange 16.

Positioned between the unit 11, 13 and the outlet portion 15 is a liquid control or filtering device 17 of any suitable character. This may include an upper plate 18 perforated as at 19, a lower plate 20 perforated as at 21, and a sheet of filter material or paper 22 between the plates.

A means 23 interengages the unit 11, 13 with the upper container 14 so as to operatively support and interengage the latter on and with the former, and to hold the filtering device 17 in place. The means 23 preferably consists of a one piece flexibly elastic material such as rubber, but equivalent means for easy connection may be substituted.

The means 23 may include a relatively thin walled sleeve or tube portion 24 adapted to be stretched over and around the outlet portion 15 for releasably engaging therewith. The means 23 may include another portion for engagement with the unit 11, 13, such as a sleeve portion 25 for receiving and gripping around the upper end of the tube 13, as with the aid of an annular bead 26 on the latter; it may also have liquid tight engagement with the wall 12, as by means, preferably, of an external annular flange portion 27 that provides an annular groove for receiving the free edge portion of the wall 12. Since the internal diameter of glassware varies considerably, it is necessary to prevent the sleeve portion 25 from becoming tightly bound in between tube 13 and the wall 12. For this purpose, the sleeve 25 has portions spaced from the wall 12, as by means of upright grooves 28 in the outside face of the sleeve 26. The latter need not be relied upon to support or aline the upper container 14, which may instead be alined and carried at the groove 29 formed by the flange 27.

The portions 25 and 27 provide in general a heavy body or thick walled lower portion for the means 23, and thus afford an adequate seat for the device 17. This seat may include a rabbeted annular seat 30 for the correspondingly rabbeted edge of the plate 18; and an annular seat 31 for the plate 20. These seats face upward in opposed relation to the seating flange 16, so as to thus annularly secure the device 17 with the plate 18 bearing upward against the seat 16.

It is essential that the device 17 be clamped in a liquid tight manner, and this is best accomplished by pressing the relatively thin portion 24 downward relatively to the thick portions 25, 27 so as to expand and reversely annularly fold the portion 24 into the position shown in dot dash lines. If now the portion 24 is upwardly sprung, it tends to roll along and grip the outlet portion 15 so as to resiliently tightly clamp the device 17 in position, without necessitating any other manipulation.

To prevent contact of hot liquid with rubber, I prefer to form the plate 20 with a tubular portion 32 which may project into the upper end of the tube 13 as shown, in a relatively close fit therewith.

The manner of assembling the device 10 will now be described. The means or coupling 23 is first folded to the dot dash line position, and the device 17 is now easily placed on thus fully exposed seats 30, 31. The means is then placed snugly against the outlet portion 15, and folded back to normal position as shown. It will be understood that the tube 13 may have been initially connected to the sleeve 25. Now the thus interconnected parts 13, 14, 17 and 23 are placed over the lower container 11 so that the elements 13, 25 enter the wall 12, while the latter enters the groove 29 for snug fluidtight engagement therein. The assembling is thus complete. The manner of using the device 10 is conventional.

If the tube 13 is accidentally struck it will not be broken because of the flexible elastic connection. Special attachments for removably strongly securing the filtering device are unnecessary. No troublesome binding of rubber with the lower container can occur, since the flange 27 is not confined. A handle (not shown) may be secured to the unobstructed neck 12.

I claim:

1. A vacuum coffee maker including a lower container having a wall defining a top opening, an upper container having a bottom outlet portion, a tube separate from said containers and extending from said outlet portion into the lower container through said opening and in annularly spaced relation to the said wall of said opening, a single means of flexible elastic material comprising a plurality of portions, one for connection with the outlet portion, and the other for engaging said wall and said tube for thus interengaging the containers and the tube with the upper container, a generally rigid filtering device within said means, the latter coacting with the outlet portion to directly operatively secure the filtering device.

2. A vacuum coffee maker including a lower container having at the top thereof an opening defining wall, an upper container having an outlet portion, a separate tube extending through said opening to intercommunicate the outlet portion with the lower container, a filtering device, and means consisting of a flexible elastic material having a portion removably engageable with the outlet portion and having a seat therein for the filtering device, the latter being removably secured between said seat and said outlet portion, the said means having another portion for engagement with said tube and releasable engagement with said wall.

3. A vacuum coffee maker including a unit comprising a lower container having a top opening portion and a tube therein and engaged with said top opening portion in a liquid tight manner, a separate upper container having a lower outlet portion, a filtering device having a rigid member, a coupling of flexible elastic material between said unit and said outlet portion, said coupling having an upward facing seat, said outlet having a downward seat, said device being removably resiliently clamped between said seats by releasable resilient engagement of the coupling with the upper container, with the coupling being annularly clamped around said member.

4. A vacuum coffee maker including a lower container having an opening defining top wall, a tube in the container annularly spaced from said wall, an upper container having a bottom outlet portion, a filtering device upwardly seated against the said outlet portion, said filtering device including a tubular portion extending into engagement with the upper end of the said tube, and means consisting of a flexible elastic material comprising a plurality of portions, one portion surrounding and holding said device against the outlet portion and removably engaging the latter, another portion of said means being of sleeve form fitted between said tube and said wall and interengaging the tube in a liquid tight manner with the wall.

5. A vacuum coffee maker including a lower container having an opening defining top wall, an upper container supported on the lower container and having a bottom outlet portion, a tube in the lower container and the opening thereof and intercommunicating said containers, a means consisting of flexible elastic material and serving to support the upper on the lower container, said means comprising a sleeve portion, said tube being annularly spaced from said wall, said sleeve portion being releasably extended into said wall and said means having a thin walled tubular portion for engaging the outlet portion, the sleeve portion and said wall having portions spaced from each other so that the sleeve portion cannot become bound in said wall regardless of variations in the diameter of said wall, and said means having an integral portion around the sleeve portion for releasably engaging around the outside of the wall to effect a non-binding fluid tight engagement therewith, said thin walled portion being expandible for annularly folding around the outside of said integral portion and for reversely folding to grip the outer portion.

6. In a vacuum coffee maker, a container having an outlet portion, a filtering device removably positioned against the outlet portion, and means consisting of a flexible elastic material having a relatively thin walled tubular portion for engaging around the outside of the outlet portion and a relatively thick walled tubular portion for internally seating the filtering device against the outlet portion, the thin walled portion being expandible for annularly folding around the outside of the thick walled portion for gripping the outlet portion upon folding the thin walled portion away from the thick walled portion to thus secure the filtering device tightly between the outlet portion and the thick walled portion.

7. A vacuum coffee maker including a lower container element having a wall defining a top opening, an upper container element having a bottom outlet portion, a tube separate from said container element and extending from said outlet portion into the lower container element through said opening and in annularly spaced relation to said wall of said opening, a one piece flexible coupling connecting the outlet portion with the lower container element at the opening thereof, and connecting the tube with the outlet portion to thus constitute the tube the sole means of communication between the said container elements, and a filtering device within the flexible coupling, the latter comprising a rigid member coacting with one of the elements for directly operatively securing the filtering device.

8. A vacuum coffee maker including a lower container having at the top thereof an opening defining wall, an upper container having at the bottom thereof an outlet portion engaged with said wall, a tube separate of the upper container and extending through said opening into the lower container, a filtering device including a rigid member, means connected to said tube and removably connected to said outlet portion and said wall, said means consisting of a flexible elastic material and having a portion for annularly clamping around said member for supporting the device so that liquid flowing through the tube between the lower and the upper containers is constrained to flow through said device.

JOHN E. MARSDEN.